US012809022B2

(12) United States Patent
Park et al.

(10) Patent No.: US 12,809,022 B2
(45) Date of Patent: Nov. 24, 2026

(54) APPARATUS AND METHOD FOR DETECTING CHARACTERISTIC OF OBJECT BASED ON FREQUENCY-MODULATED SIGNAL

(71) Applicant: SAMSUNG ELECTRONICS CO., LTD., Suwon-si (KR)

(72) Inventors: Sang Yun Park, Suwon-si (KR); Byung Hoon Ko, Suwon-si (KR); Seung Woo Noh, Suwon-si (KR); Jin Woo Choi, Suwon-si (KR); Seung Tae Khang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 180 days.

(21) Appl. No.: 18/784,187

(22) Filed: Jul. 25, 2024

(65) Prior Publication Data

US 2025/0147177 A1 May 8, 2025

(30) Foreign Application Priority Data

Nov. 2, 2023 (KR) ........................ 10-2023-0150165

(51) Int. Cl.
*G01S 15/32* (2006.01)
*G01S 7/536* (2006.01)
*G01S 7/62* (2006.01)

(52) U.S. Cl.
CPC .............. *G01S 15/32* (2013.01); *G01S 7/536* (2013.01); *G01S 7/62* (2013.01)

(58) Field of Classification Search
CPC ............. G01S 15/32; G01S 7/536; G01S 7/62
See application file for complete search history.

(56) References Cited

U.S. PATENT DOCUMENTS

| | | | | |
|---|---|---|---|---|
| 7,668,045 | B2 | 2/2010 | Lee | |
| 2013/0301391 | A1* | 11/2013 | Altman | G01S 15/003 73/632 |
| 2015/0192672 | A1* | 7/2015 | Doherty | G01S 7/54 367/88 |

FOREIGN PATENT DOCUMENTS

| | | | | |
|---|---|---|---|---|
| CN | 110220976 B | 4/2022 | | |
| CN | 114578363 A | 6/2022 | | |
| EP | 2463683 A1 * | 6/2012 | G01S 13/34 | |
| JP | 2011-69638 A | 4/2011 | | |
| KR | 10-0583556 B1 | 5/2006 | | |

* cited by examiner

*Primary Examiner* — Krystine E Breier
(74) *Attorney, Agent, or Firm* — Sughrue Mion, PLLC

(57) ABSTRACT

An apparatus for detecting an object may include: a transmitter configured to emit a frequency-modulated ultrasonic signal toward the object; a receiver configured to receive an echo signal from the object in response to the frequency-modulated ultrasonic signal being reflected from the object; a mixer configured to mix the frequency-modulated ultrasonic signal with the echo signal to output a mixer signal; and one or more processors configured to estimate a distance from the apparatus to the object based on the mixer signal, and detect a characteristic of the object based on the estimated distance.

15 Claims, 12 Drawing Sheets

APPARATUS AND METHOD FOR DETECTING CHARACTERISTIC OF OBJECT BASED ON FREQUENCY-MODULATED SIGNAL

CROSS-REFERENCE TO RELATED APPLICATION(S)

This application claims priority from Korean Patent Application No. 10-2023-0150165, filed on Nov. 2, 2023, in the Korean Intellectual Property Office, the entire disclosure of which is incorporated herein by reference in its entirety.

BACKGROUND

1. Field

Apparatuses and methods consistent with example embodiments relate to detecting a characteristic of an object based on a frequency-modulated signal.

2. Description of the Related Art

In distance measurement using ultrasonic sensors, ultrasonic waves are generated and incident on an object. Distance is measured by calculating time taken for the ultrasonic signal to reflect back from the object. The distance measurement method using an ultrasonic sensor is performed with simple and relatively inexpensive equipment, and is mostly used indoors for measuring the position of obstacles or distance to obstacles. Although the distance measurement method using the ultrasonic sensor may be performed in a relatively simple and inexpensive manner, it has a limited measurement distance and resolution. The speed and energy of ultrasonic waves of a typical ultrasonic sensor change depending on the properties of sound propagation in air or other medium, thereby causing an error in distance measurement.

SUMMARY

According to an example embodiment of the present disclosure, there is provided an apparatus for detecting an object, the apparatus including: a transmitter configured to emit a frequency-modulated ultrasonic signal toward the object; a receiver configured to receive an echo signal from the object in response to the frequency-modulated ultrasonic signal being reflected from the object; a mixer configured to mix the frequency-modulated ultrasonic signal with the echo signal to output a mixer signal; and one or more processors configured to estimate a distance from the apparatus to the object based on the mixer signal, and detect a characteristic of the object based on the estimated distance.

The apparatus may further include an analog-to-digital converter (ADC) configured to convert the mixer signal into a digital signal and transmit the digital signal to the one or more processors.

The one or more processors may be configured to estimate the distance by performing frequency analysis on the digital signal through Fast Fourier Transform (FFT).

The one or more processors may be configured to obtain a frequency response characteristic of the object based on the estimated distance, and to detect the characteristic of the object based on the obtained frequency response characteristic.

The one or more processors may be configured to align the mixer signal in a time domain based on the estimated distance, and to obtain the frequency response characteristic based on the aligned mixer signal.

The one or more processors may be configured to determine an analysis range of the aligned mixer signal based on at least one of the estimated distance, frequency sweep duration, and a frequency sweep rate of the frequency-modulated ultrasonic signal.

The one or more processors may be configured to detect an envelope based on a signal strength of the aligned mixer signal, and to obtain the frequency response characteristic based on the envelope of the aligned mixer signal.

The one or more processors may be configured to obtain the frequency response characteristic by correcting a frequency characteristic of the transmitter.

The one or more processors may correct the frequency characteristic of the transmitter by dividing the obtained frequency response characteristic or the mixer signal by the frequency characteristic of the transmitter.

The one or more processors may be configured to obtain the characteristic of the object by comparing the obtained frequency response characteristic with a frequency response characteristic template pre-stored in a storage device or by inputting the obtained frequency response characteristic to a pre-trained neural network.

In response to the estimated distance being greater than or equal to a threshold value, the one or more processors may be configured to detect the characteristic of the object.

According to another aspect of the present disclosure, there is provided a method of detecting an object, the method including: emitting a frequency-modulated ultrasound signal toward the object; receiving an echo signal from the object in response to the frequency-modulated ultrasonic signal being reflected from the object; mixing the frequency-modulated signal with the echo signal to output a mixer signal; estimating a distance to the object based on the mixer signal; and detecting a characteristic of the object based on the estimated distance.

In addition, the method of detecting a characteristic of an object based on a frequency-modulated signal may further include converting the mixer signal into a digital signal.

The estimating of the distance from the object may include estimating the distance to the object by performing frequency analysis on the digital signal through Fast Fourier Transform (FFT).

The detecting of the characteristic of the object may include obtaining a frequency response characteristic of the object based on the estimated distance, and detecting the characteristic of the object based on the obtained frequency response characteristic.

The obtaining of the frequency response characteristic of the object may include aligning the mixer signal in a time domain based on the estimated distance.

The obtaining of the frequency response characteristic of the object may further include determining an analysis range of the aligned mixer signal based on at least one of the estimated distance, a frequency sweep duration, and a frequency sweep rate of the frequency-modulated ultrasonic signal.

The obtaining of the frequency response characteristic of the object may further include detecting an envelope based on a signal strength of the aligned mixer signal.

The obtaining of the frequency response characteristic of the object may include obtaining the frequency response characteristic by correcting a frequency characteristic of a transmitter configured to emit the frequency-modulated ultrasound signal.

According to another aspect of the present disclosure, there is provided an electronic device including: an ultrasound sensor configured to: emit a frequency-modulated ultrasonic signal toward an object; receive an echo signal from the object in response to the frequency-modulated ultrasonic signal being reflected from the object; mix the frequency-modulated ultrasonic signal with the echo signal to output a mixer signal; estimate a distance to the object based on the mixer signal; and detect a characteristic of the object based on the estimated distance; a memory storing one or more instructions; a display; and a processor configured to execute the one or more instructions to operate the ultrasound sensor and to control the display to display the characteristic of the object.

BRIEF DESCRIPTION OF THE DRAWINGS

The above and/or other aspects will be more apparent by describing certain example embodiments, with reference to the accompanying drawings, in which.

DETAILED DESCRIPTION

Figure 1A:
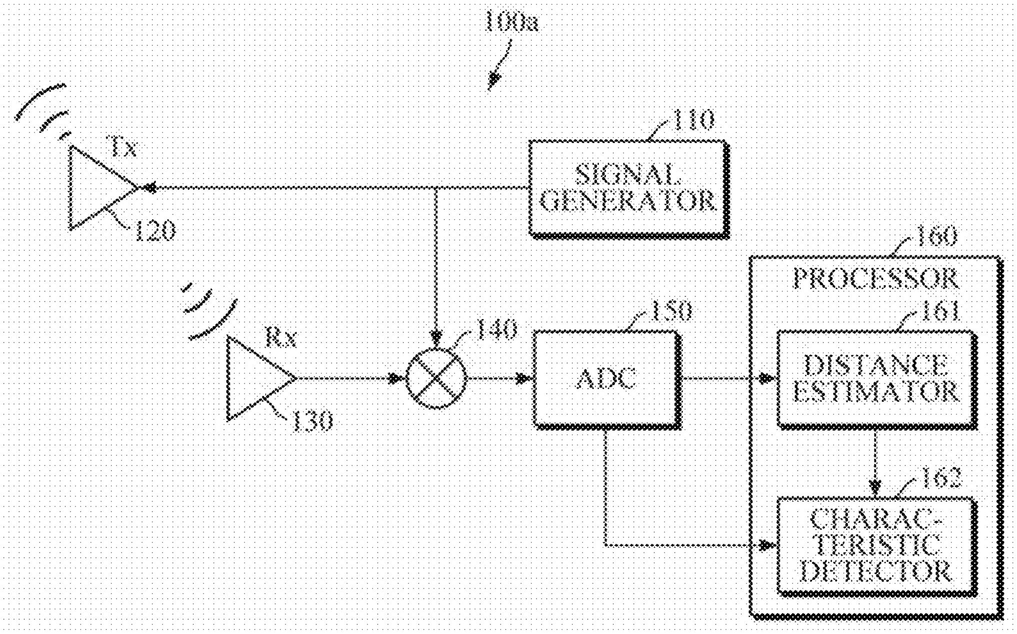
FIGS. 1A and 1B are block diagrams illustrating an apparatus for detecting a characteristic of an object based on a frequency-modulated signal according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms "first," "second," etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as "unit" or "module," etc., should be understood as a unit that performs at least one function or operation and that may be embodied as hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Figure 1B:
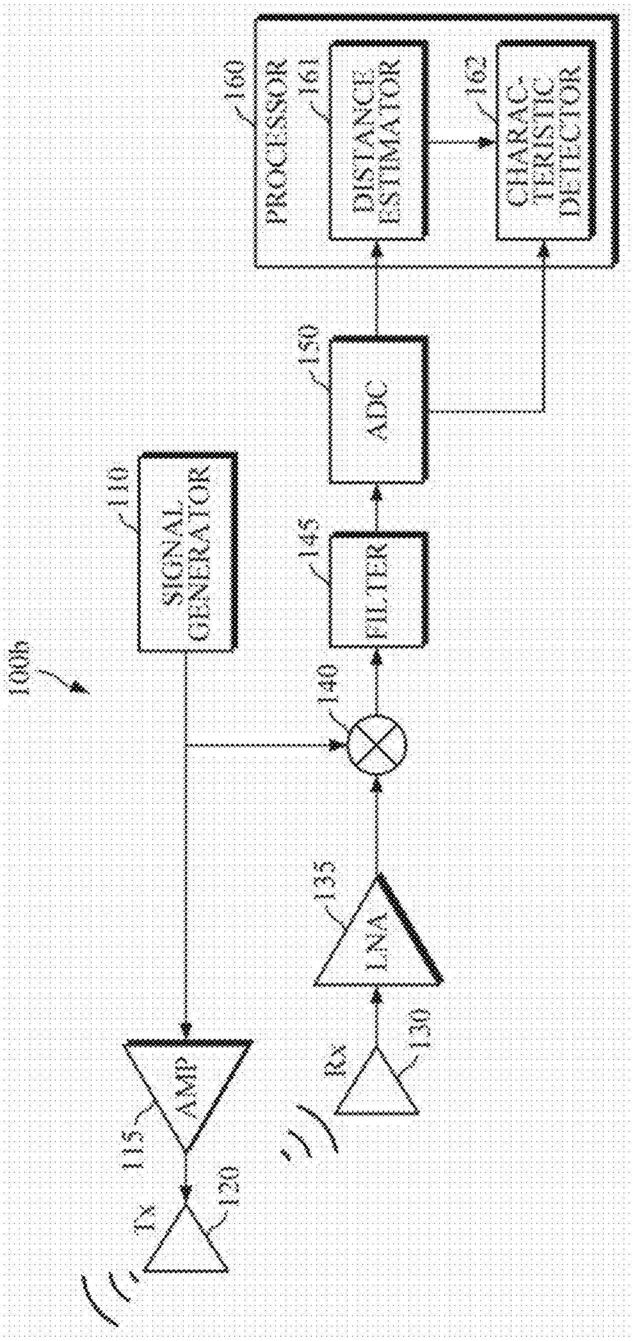
Figure 2:
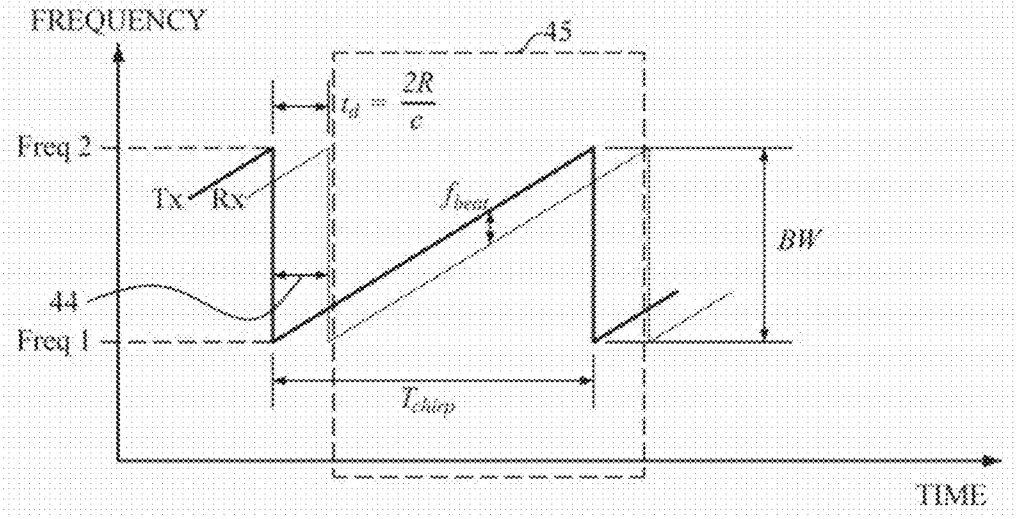
FIG. 2 is a graph illustrating a method of driving an ultrasonic signal according to an embodiment of the present disclosure.
Figure 3:
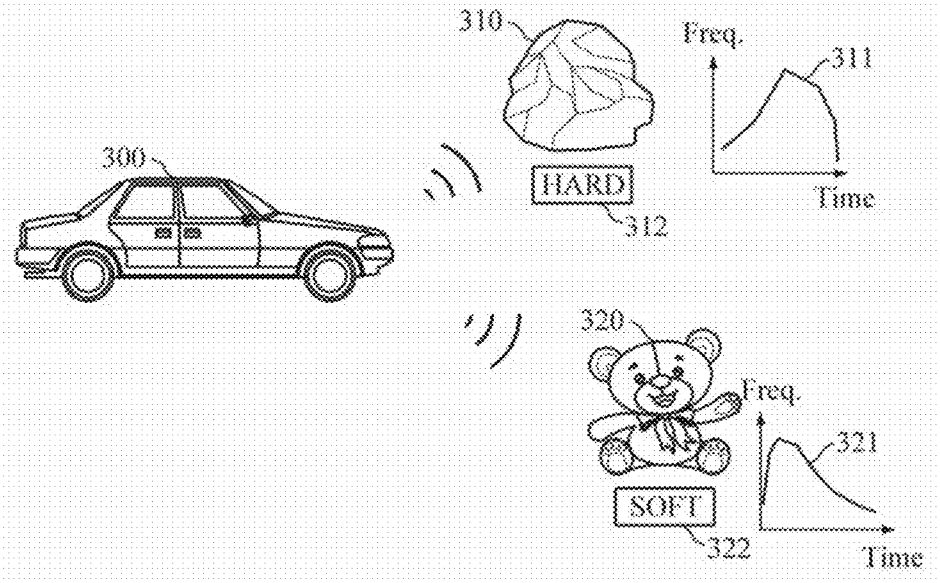
FIG. 3 is a diagram explaining a relationship between an object characteristic and a frequency response characteristic.

FIGS. 1A and 1B are block diagrams illustrating an apparatus for detecting a characteristic of an object based on a frequency-modulated signal according to embodiments of the present disclosure. FIG. 2 is a graph illustrating a method of driving an ultrasonic signal according to an embodiment of the present disclosure. FIG. 3 is a diagram explaining a relationship between an object characteristic and a frequency response characteristic.

Referring to FIG. 1A, an apparatus **100*a* for detecting a characteristic of an object based on a frequency-modulated signal includes a signal generator 110, a transmitter 120, a receiver 130, a mixer 140, an Analog-to-Digital Converter (ADC) 150, and one or more processors 160. Referring to FIG. 1B, an apparatus 100*b* for detecting a characteristic of an object based on a frequency-modulated signal may further include a power amplifier (AMP) 115, a low noise amplifier (LNA) 135, and a filter 145. The respective components may be implemented as hardware or software, or a combination thereof The signal generator 110 may generate a frequency-modulated signal. The frequency-modulated signal may be a frequency-modulated ultrasonic signal, a radio frequency (RF) radar signal, etc., but is not limited thereto. The frequency-modulated signal may be a sawtooth wave, triangle wave, or hyperbolic chirp signal. The frequency-modulated ultrasonic signal may be a continuous wave or chirp pulse signal. In an embodiment of the present disclosure, the signal generator 110 may apply a Frequency Modulated Continuous Wave (FMCW) technique to generate a continuous wave (CW) signal that is modulated in frequency. The CW signal may be a chirp signal that linearly changes in frequency over time. The CW signal may be generated at a specific frequency, and the frequency of the CW signal may be then continuously modulated (i.e., swept) over a preset frequency range. The CW signal may has a waveform shaped as sawtooth, triangle, or hyperbolic. The signal generator 110** may generate a chirp pulse signal, instead of or in addition to the CW signal. The following description will be given using the frequency-modulated ultrasonic signal as an example.

Referring to FIG. 2, the signal generator 110 may use a frequency bandwidth BW that is preset in consideration of a target resolution and the like. The signal generator 110 may generate an ultrasonic signal that is continuously modulated (i.e., swept) over a predetermined chirp period $T_{chirp}$ according to the preset frequency bandwidth. Here, $t_d$ denotes the duration of a time taken for the ultrasonic signal to return after being emitted (as a transmission signal $T_x$) and reflected (as an echo signal $R_x$) from an object, R denotes a distance to the object, c denotes a speed of carrier wave (ultrasonic wave), and $f_{beat}$ denotes a tone frequency. A frequency range from Freq 1 to Freq 2 shown in FIG. 2 corresponds to that shown in FIG. 4E. A chirp length 44 and an analysis range 45 shown in FIG. 2 correspond to those depicted in FIG. 4C.

The transmitter 120 may emit an ultrasonic signal toward an object. As illustrated in FIG. 1B, the ultrasonic signal may be amplified by the AMP 115 to be transmitted to the transmitter 120. The receiver 130 may receive an echo signal reflected from the object. The transmitter 120 and the receiver 130 may be implemented as at least one piezoelectric transducer including a piezoelectric sensor and a piezoelectric actuator (which is also referred to as a piezoelectric transmitter). The piezoelectric sensor may sense mechanical changes in the air in the outside of the apparatus 100*b* and may translate the changes into an electrical signal which can be used to measure those change. The piezoelectric actuator may convert the electrical signal into mechanical energy or physical movement. Each of the transmitter 130 and the receiver 140 may consist of a combination of independent elements/components. A channel consisting of a pair of one transmitter 120 and one receiver 130 may be formed, or multi-channels consisting of pairs of one or more transmitters 120 and a plurality of receivers 130 or pairs of a plurality of transmitters 120 or one or more receivers 130 may be formed. In this case, the transmitter 120 and the receiver 130 of each channel may be formed separately, or may be integrated into one package.

The frequency-modulated ultrasonic signal generated by the signal generator 110 may be input to the mixer 140 to be mixed with the echo signal received by the receiver 130. The received echo signal may be amplified by the LNA 135 to be input to the mixer 140, as illustrated in FIG. 1B.

The mixed signal output from the mixer 140 may be converted by the ADC 150 into a digital signal to be input to the one or more processors 160. As illustrated in FIG. 1B, the mixed signal is filtered by the filter 145 such that a sum frequency component between the ultrasonic signal and the echo signal may be removed, and a beat frequency signal, having a difference frequency component between the ultrasonic signal and the echo signal, may be transmitted to the ADC 150. The filter 145 may be a low pass filter, a band pass filter, and the like.

The processor 160 includes a distance estimator 161 and a characteristic detector 162, and the distance estimator 161 and the characteristic detector 162 may be implemented by a single processor or by multiple processors.

The distance estimator 161 may measure a distance from an object by using a beat frequency output by the mixer 140. The distance estimator 161 may perform Fast Fourier Transform (FFT) on the beat frequency to measure a distance from an object based on the frequency analysis result.

The characteristic detector 162 may receive the estimated distance information from the distance estimator 161, and the digitized mixer signal from the ADC 150. The characteristic detector 162 may detect a characteristic of an object based on the distance information and the mixer signal. If the estimated distance is greater than a threshold value, the characteristic detector 162 may perform the operation of detecting the object characteristic. The object characteristic may include types of an object (e.g., person, vehicle, stone, road, etc.), mechanical/physical characteristics of an object (e.g., softness, hardness, normal road surface, frozen road surface, wet road surface), and the like.

The characteristic detector 162 may obtain a frequency response characteristic of the object based on the distance estimated by the distance estimator 161, and may detect a characteristic of the object based on the obtained frequency response characteristic. FIG. 3 is a diagram illustrating an example in which a device 300, including the apparatus 100 for detecting a characteristic of an object, detects characteristics of objects 310 and 320 based on an ultrasonic signal, in which the object 310 having a hard property 312 and the object 320 having a soft property 322 exhibit different frequency characteristics 311 and 321. A degree of ultrasound reflection varies depending on object characteristics, such that the frequency response characteristics may have a predetermined correlation with the object characteristics.

The characteristic detector 162 may align a mixer signal in a time domain based on the estimated distance. The characteristic detector 162 may align the mixer signal by calculating which part of the mixer signal in time series corresponds to a specific frequency of the transmission signal Tx based on the estimated distance information, and may interpolate the signal as needed. In this case, the estimated distance from the object, a length and sweep rate of the ultrasonic signal, and the like may be used. Further, the characteristic detector 162 may determine an analysis range in the aligned mixer signal based on the estimated distance, the length and sweep rate of the ultrasonic signal, and the like. For example, the analysis range may be determined to be a size corresponding to the length of the ultrasonic signal. One or more analysis ranges may be determined. If a plurality of analysis ranges are determined, a signal-to-ratio may be improved by adding up the signals in the plurality of analysis ranges.

The characteristic detector 162 may correct frequency characteristics of the elements 120 and 130 so as to recover only the frequency characteristic of an object from the aligned mixer signal. For example, the characteristic detector 162 may correct the frequency characteristic of the transmitter 120 by using a method of dividing the aligned mixer signal in time series by the natural frequency characteristic of the transmitter 120 and/or frequency characteristics according to distance, and the like. However, the characteristic detector 162 is not limited thereto. The natural frequency characteristics of the elements 120 and 130 and frequency characteristics according to distance may be previously measured through preprocessing and pre-stored in a storage device.

The characteristic detector 162 may detect an envelope based on a signal strength of the aligned mixer signal. The characteristic detector 162 may extract peaks and valleys of signal amplitudes in the analysis range of the aligned mixer signal in the time domain, and may obtain an envelope by connecting the peaks and valleys.

The characteristic detector 162 may obtain a frequency response characteristic of an object by using the obtained envelope. For example, the characteristic detector 162 may obtain a frequency response characteristic curve by subtracting valley values from peak values of a time series envelope and by plotting against corresponding frequencies.

Upon obtaining the frequency response characteristic of the object, the characteristic detector 162 may obtain a characteristic of the object that corresponds to the obtained frequency response characteristic. For example, a frequency response characteristic template, which defines a correlation between frequency response characteristics and object characteristics, may be previously stored in a storage device. In another example, an Artificial Intellectual Neural Network algorithm, which is previously trained to output object characteristics by using frequency response characteristics as input, may be predefined. The Neural Network architecture may include Deep Neural Network, Convolutional Neural Network, Recurrent Neural Network, etc., but is not limited thereto. Upon obtaining the frequency response characteristic of the object and the object characteristic corresponding thereto, the characteristic detector 162 may update libraries, such as lookup tables and the like stored in a storage device, or may train the neural network.

Further, the characteristic detector 162 may correct the frequency response characteristics of the transmitter 120 and the receiver 130 for the obtained frequency response characteristic. For example, the obtained frequency response characteristic may be multiplied by the natural frequency response characteristic of the transmitter 120. Accordingly, the characteristic detector 162 may obtain a final frequency response characteristic by dividing the obtained frequency response characteristic by the natural frequency response characteristic of the transmitter 120.

FIGS. 4A to 4E are diagrams explaining an example of obtaining a frequency response characteristic of an object according to an embodiment of the present disclosure.

Figure 4A:
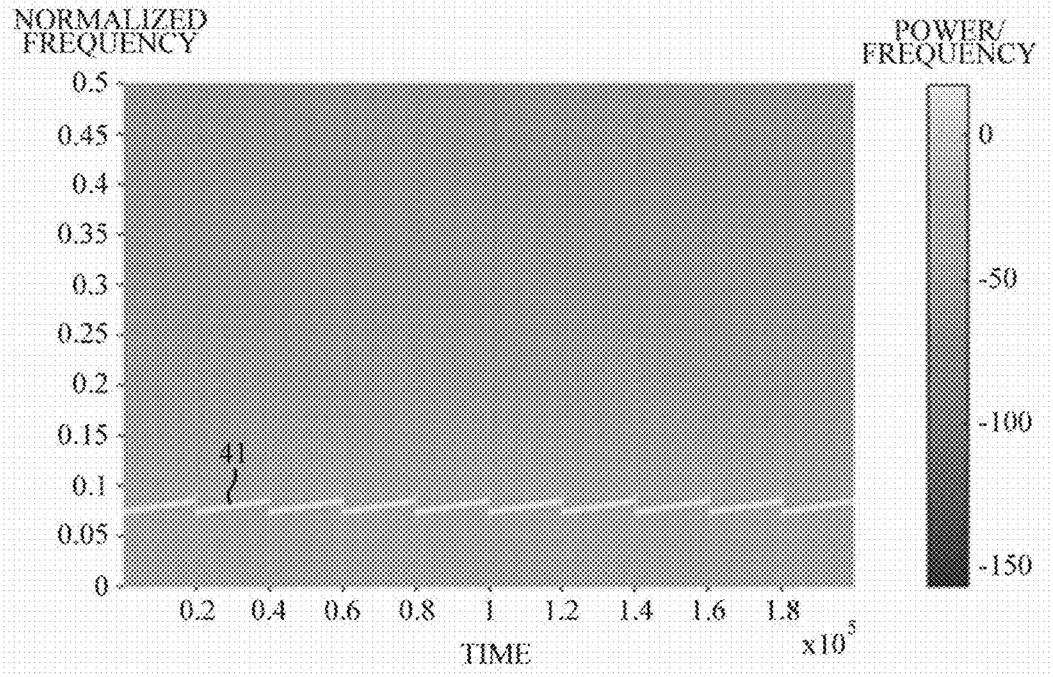
FIGS. 4A to 4E are diagrams explaining an example of obtaining a frequency response characteristic of an object according to an embodiment of the present disclosure.
Figure 4B:
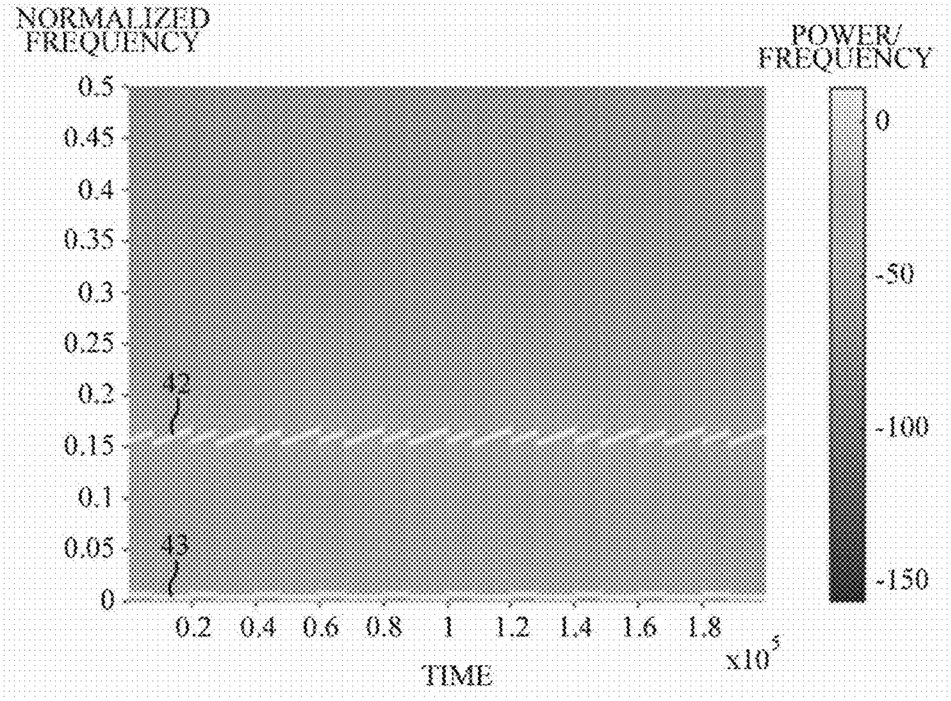

FIG. 4A is a diagram illustrating a spectrogram of a transmission signal 41 emitted by the transmitter 120. FIG. 4B is a diagram illustrating a spectrogram of mixer signals 42 and 43 obtained by mixing the transmission signal 41 having the spectrogram of FIG. 4A with the echo signal received by the receiver 130.

Figure 4C:
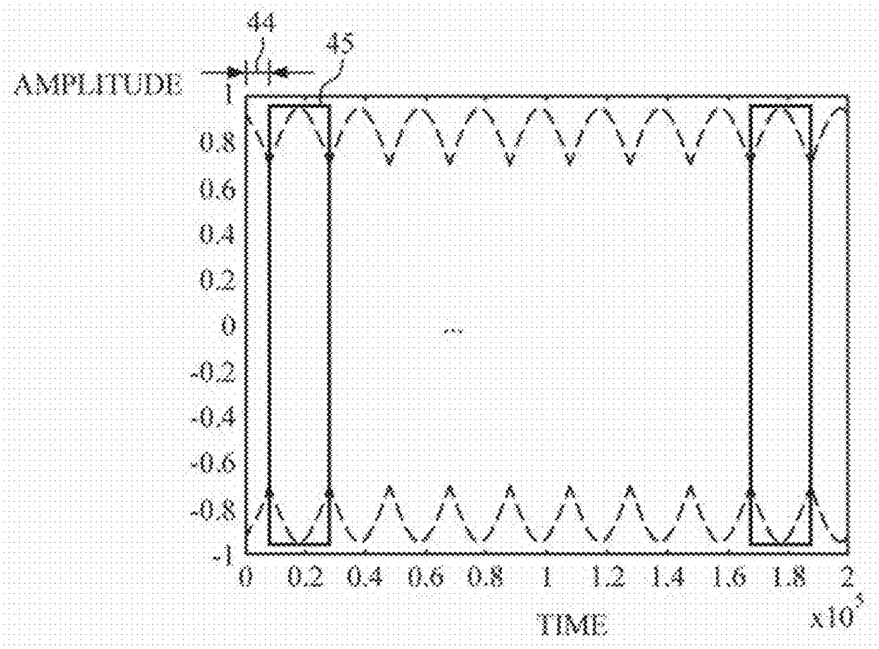
Figure 4D:
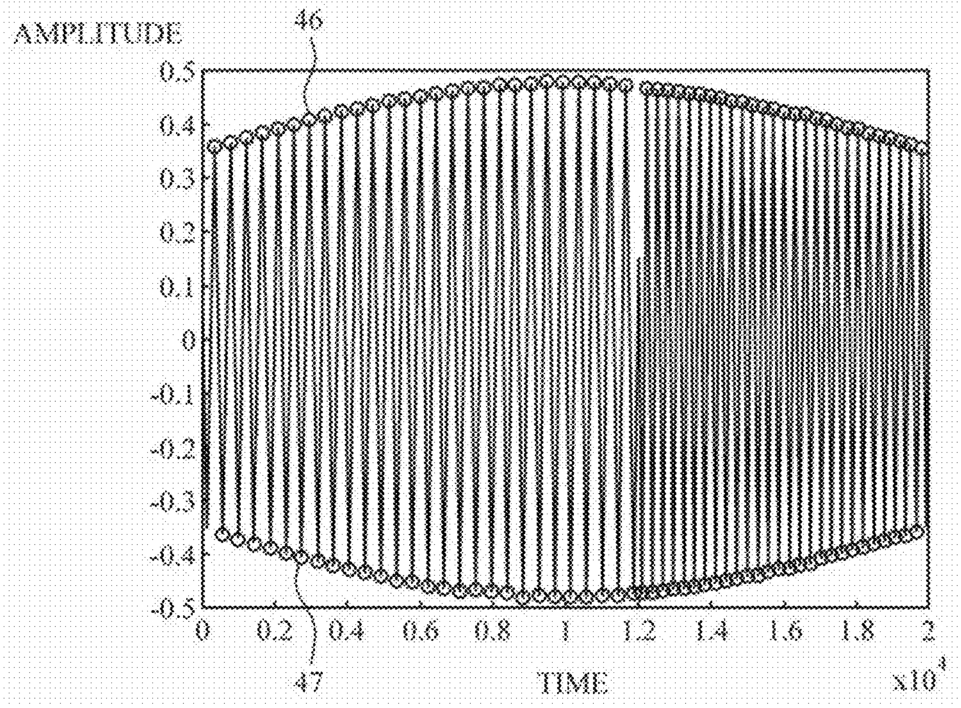
Figure 4E:
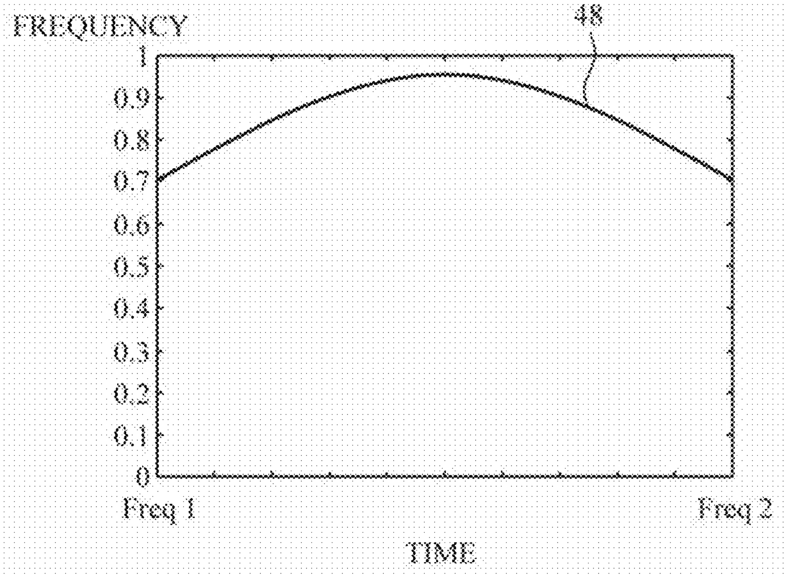

The operation of mixing the transmission signal 41 with the echo signal may results in a first signal having a sum frequency component $\omega_{Tx}+\omega_{Rx}$, and a second signal having a difference frequency component $|\omega_{Tx}-\omega_{Rx}|$. The mixer signals 42 and 43 are filtered such that a beat frequency having the sum frequency component $\omega_{Tx}+\omega_{Rx}$ may be removed, and a beat frequency having the difference frequency component $|\omega_{Tx}-\omega_{Rx}|$ may be used for distance measurement, wherein $\omega_{Tx}$ denotes a frequency component of the transmission signal 41, and $\omega_{Rx}$ denotes a frequency component of the echo signal. FIG. 4C is a diagram illustrating an aligned mixer signal in a time domain, in which an analysis range 45 may be determined based on a chirp length 44 in a time domain. The chirp length 44 may correspond to $T_{chirp}$ in FIG. 2. The chirp length may represent a time taken for a signal to travel from the apparatus 100*a* and 100*b* to an object and return from the object to the apparatus 100*a* and 100*b*, and the analysis range 45 may be determined by the time interval from a point spaced by the chirp length. The analysis range 45 may represent a time window corresponding to the chirp length 44. In this case, a plurality of analysis ranges may be determined based on the chirp length, and a signal-to-ratio may be improved by adding up the signals in the plurality of analysis ranges. FIG. 4D is a diagram illustrating an envelope extracted in the analysis range 45. A peak 46 and a valley 47 may be extracted in the analysis range 45 based on a signal strength, and the envelope may be obtained by using the extracted peak 46 and valley 47. FIG. 4E is a diagram illustrating a frequency response characteristic curve 48 obtained using the envelope of FIG. 4D. For example, the frequency response characteristic of an object may be obtained by subtracting the valley value from the peak value of the envelope of FIG. 4D and by plotting in the frequency domain.

Figure 5:
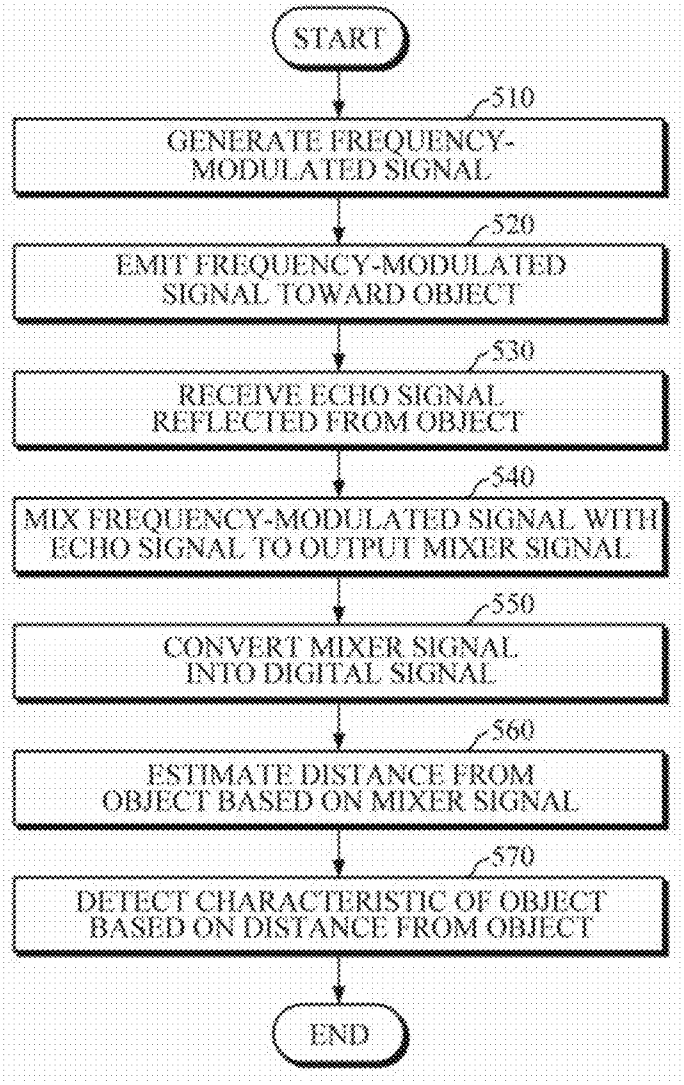
FIG. 5 is a flowchart illustrating a method of detecting a characteristic of an object based on a frequency-modulated signal according to an embodiment of the present disclosure.

FIG. 5 is a flowchart illustrating a method of detecting a characteristic of an object based on a frequency-modulated signal according to an embodiment of the present disclosure. FIG. 5 is an example of the method performed by the apparatus 100*a* and 100*b* for detecting a characteristic of an object based on a frequency-modulated signal, and thus will be briefly described below.

The apparatus 100*a* and 100*b* for detecting a characteristic of an object based on a frequency-modulated signal may generate a frequency-modulated signal in operation 510. The frequency-modulated signal may be a continuous chirp wave signal or a chirp pulse signal. The continuous chirp wave signal may has a waveform shaped as sawtooth, triangle, or hyperbolic.

Then, the apparatus 100*a* and 100*b* may emit the frequency-modulated signal toward an object in operation 520, and may receive an echo signal reflected from the object in operation 530. For example, the apparatus 100*a* and 100*b* may emit a continuous wave with a frequency that is modulated in a linear manner over time, as the frequency-modulated signal, toward the object. When the signal encounters the object, it reflects back to the apparatus 100*a* and 100*b* and is received as the echo signal.

Subsequently, the apparatus 100*a* and 100*b* signal may mix the generated frequency-modulated signal with the echo signal to output a mixer signal in operation 540. The mixer signal may be filtered by a low pass filter, a band pass filter, etc., such that a sum frequency component between the frequency-modulated signal and the echo signal may be removed, and a beat frequency signal, having a difference frequency component between the frequency-modulated signal and the echo signal, may be output.

Next, the apparatus 100*a* and 100*b* may convert the mixer signal in analog signal form into a digital signal in operation 550. The apparatus 100*a* and 100*b* may measure a position of the object based on frequency analysis in operation 560, for example, through Fast Fourier Transform. The apparatus 100*a* and 100*b* may analyze a frequency difference between the transmission signal and the eco signal, which may be proportional to the distance to the object.

Then, the apparatus 100*a* and 100*b* may detect a characteristic of the object based on the estimated distance in operation 570. The object characteristic may include types and mechanical/physical characteristics of the object, and the like. The apparatus 100*a* and 100*b* may obtain a frequency response characteristic of the object based on a distance from the object, and may detect the characteristic of the object by using pattern-matching in a library, such as a lookup table that defines a relationship between the frequency response characteristic of the object and the characteristic of the object, or by using an artificial intelligence neural network previously generated through training.

Figure 6:
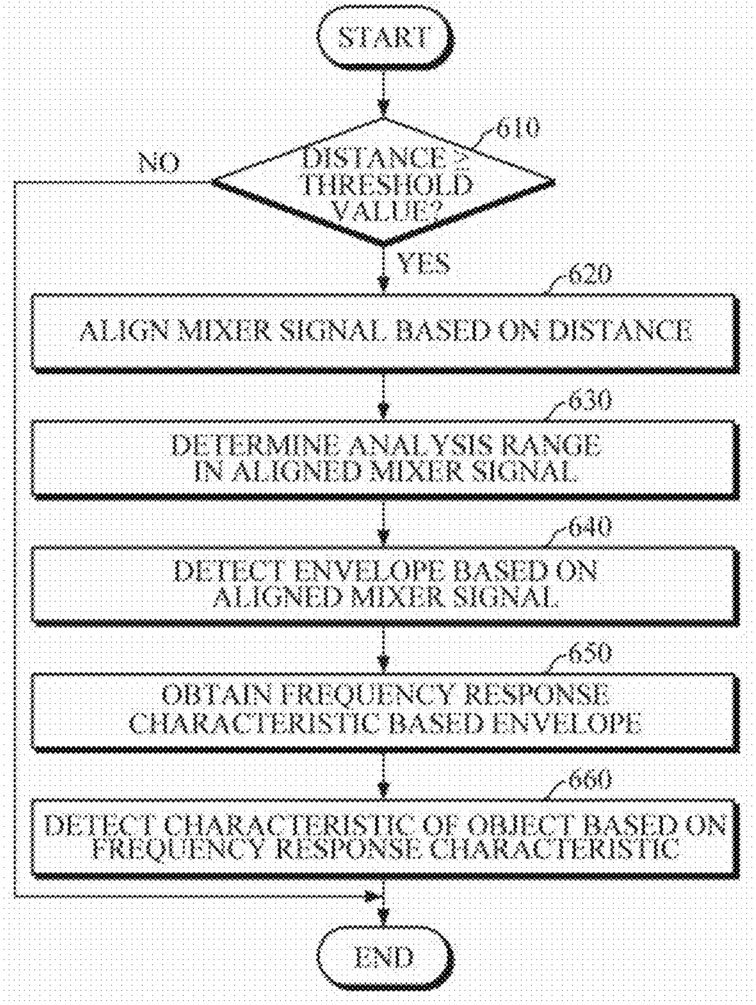
FIG. 6 is a flowchart illustrating the detecting of a characteristic of an object according to an embodiment of the present disclosure.

FIG. 6 is a flowchart illustrating the detecting of a characteristic of an object in operation 570 according to an embodiment of the present disclosure.

Referring to FIG. 6, the apparatus 100*a* and 100*b* may compare the estimated distance with a threshold value in operation 610, and if the estimated distance is greater than or equal to the threshold value, the apparatus 100*a* and 100*b* for detecting a characteristic of an object based on a frequency-modulated signal may perform the operation of detecting the object characteristic, and if not, may terminate the operation.

Then, the apparatus 100*a* and 100*b* may align the mixer signal by calculating which part of the mixer signal in time series corresponds to a specific frequency of the transmission signal Tx based on the estimated distance, and may interpolate the signal as needed in operation 620. In this case, the estimated distance from the object, a frequency sweep duration and a frequency sweep rate of the ultrasonic signal (e.g., $(y-x)/T_w$, when frequency sweep occurs from x Hz to y Hz during time $T_w$,), and the like may be used. In an embodiment of the present disclosure, the distance estimator 161 may measure a distance to an object by performing FFT on a mixer signal (e.g., a mixer signal output from the ADC 150) without alignment. Based on the distance information, the characteristic detector 162 may analyze the mixer signal in the time domain through windowing and aligning the mixer signal in the time domain, so that the characteristic detector 162 may obtain the frequency response characteristic of the object. When the windowed mixer signals are aligned in the time domain, the time stamps of each windowed mixer signal may not align smoothly due to a sampling rate for time stamps. For example, because of hardware limitations, the sampling may not be perfectly equidistant. In such cases, to align and combine the windowed mixer signals, interpolation may be performed to create virtual, perfectly timed stamps.

Further, the apparatus 100*a* and 100*b* may determine an analysis range in the aligned mixer signal based on the estimated distance, the frequency sweep duration and frequency sweep rate of the ultrasonic signal in operation 630. For example, the analysis range may be determined to be a size corresponding to the length of the ultrasonic signal. One or more analysis ranges may be determined. If a plurality of analysis ranges are determined, a signal-to-ratio may be improved by adding up the signals in the plurality of analysis ranges.

Then, the apparatus 100*a* and 100*b* may detect an envelope based on the aligned mixer signal in operation 640. For example, the apparatus 100*a* and 100*b* may extract peaks and valleys of signal amplitudes in the analysis range of the aligned mixer signal in the time domain, and may obtain an envelope by connecting the peaks and valleys.

Subsequently, the apparatus 100*a* and 100*b* may obtain a frequency response characteristic of the object based on the obtained envelope in operation 650. For example, the apparatus 100*a* and 100*b* may obtain a frequency response characteristic curve by subtracting valley values from peak values of a time series envelope and by plotting against corresponding frequencies. In this case, the apparatus 100*a* and 100*b* may correct natural frequency response characteristics of elements included in the obtained frequency response characteristic. For example, the apparatus 100*a* and 100*b* may obtain a final frequency response characteristic by dividing the obtained frequency response characteristic by the natural frequency response characteristic of the transmitter 120. The natural frequency response characteristic of the transmitter 120 may refer to the rate at which the transmitter 120 tends to oscillate in the absence of disturbance, and information of the natural frequency response characteristic may be pre-stored in the apparatus 100*a* and 100*b*.

Next, upon obtaining the frequency response characteristic of the object, the apparatus 100*a* and 100*b* may detect a characteristic of the object that corresponds to the obtained frequency response characteristic in operation 660. For example, the object characteristic may be detected by using pattern-matching in a library, such as a lookup table that defines a relationship between the frequency response characteristic of the object and the characteristic of the object, or an artificial intelligence neural network algorithm.

Figure 7:
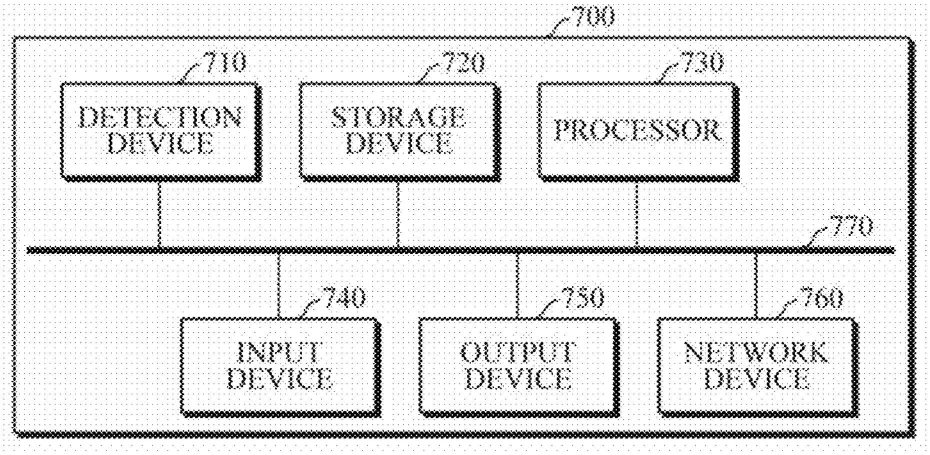
FIG. 7 is a block diagram illustrating a device including the apparatus for detecting a characteristic of an object according to an embodiment of the present disclosure.

FIG. 7 is a block diagram illustrating a device 700 including the apparatus 100*a* and 100*b* for detecting a characteristic of an object based on a frequency-modulated signal. The device 700 may be used in autonomous driving systems, flight radar systems, driver assistance systems, object recognition systems, or surveillance/security systems, and the like. The device 700 may be mounted in, for example, image processing devices, radar devices, smartphones, wearable devices, tablet computers, netbooks, laptops, desktop computers, head mounted displays (HMDs), autonomous and smart vehicles, Virtual Reality (VR) devices, Augmented Reality (AR) device, extended Reality (XR) devices, vehicles, mobile robots, and the like.

The device 700 may include a detection device (e.g., a sensor) 710, a storage device (e.g., a memory) 720, a processor 730, an input device 740, an output device 750, and a network device (e.g., a communication interface) 760. The respective components may communicate with each other through a communication bus 770 and/or a wireless communication network.

The detection device 710 may perform the function of detecting a characteristic of an object based on a frequency-modulated signal. As described above, the detection device 710 may include the signal generator, transmitter, receiver, mixer, ADC, and one or more processors. All the components of the detection device 710 may be integrated into one hardware, but is not limited thereto, and some of the components may be separately provided in consideration of various environments, such as the structure of the device 700, the purpose of object detection, the arrangement of the device 700, and the like. For example, a processor that performs the characteristic detection function may be provided as separate hardware, and a transmitter/receiver may be provided separately from other components and disposed at an appropriate position for object detection.

The storage device 720 may store data required for the operation of the device 700. The storage device 720 may store instructions for executing various functions of the device 700. The storage device 720 may include a computer-readable storage medium, e.g., Random Access Memories (RAM), Dynamic Random Access Memories (DRAM), Static Random Access Memories (SRAM), magnetic hard disk, optical disk, flash memory, Electrically Programmable Read Only Memories (EPROM), or other types of computer readable storage media known in this art.

The processor 730 may execute and/or control various functions and instructions of the device 700. For example, the processor 730 may execute program code or instructions stored in the storage device 720 to control the detection device 710, and to control the operation of the device 700 by using a distance from an object, frequency response characteristics and/or object characteristics, etc., which are received from the detection device 710. For example, if the device 700 is a vehicle, the processor 730 may control the braking distance differently based on whether a characteristic of an object detected in front of the vehicle is a person or whether a road is wet/frozen, or the like.

The input device 740 may receive a user input through tactile or haptic input, video, audio, or touch input. The input device 740 may include any other device capable of detecting an input from a keyboard, a mouse, a touch screen, a microphone, or a user and transmitting the detected input.

The output device 750 may provide the output of the computing device 700 to a user by a visual, auditory, or haptic method. For example, the output device 750 may include a liquid crystal display, a light emitting diode (LED) display, a touch screen, a speaker, a vibration generator, or any other device capable of providing the output to the user. The output device 750 may provide the output to the user based on the distance from the object, frequency response characteristics, and object characteristics which are obtained by the detection device 710, and/or by using one or more of visual information, auditory information, and haptic information related to the operation of the device controlled by the controller 730.

The network device 760 may communicate with an external device through a wired or wireless network. For example, the network device 760 may communicate with an external device by using various wired or wireless communication techniques, such as Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G, 4G, and 5G communications, direct connection via an internal bus, and the like.

Various other sensors may be included. For example, the sensors may include a radar sensor, an image sensor, a piezoelectric transducer, and the like.

The present disclosure can be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the present invention can be readily inferred by programmers of ordinary skill in the art to which the invention pertains.

The present disclosure has been described herein with regard to preferred embodiments. However, it will be obvious to those skilled in the art that various changes and modifications can be made without changing technical conception and essential features of the present disclosure. Thus, it is clear that the above-described embodiments are illustrative in all aspects and are not intended to limit the present disclosure.

What is claimed is:

1. An apparatus for detecting an object, the apparatus comprising:

a transmitter configured to emit a frequency-modulated ultrasonic signal toward the object;

a receiver configured to receive an echo signal from the object in response to the frequency-modulated ultrasonic signal being reflected from the object;

a mixer configured to mix the frequency-modulated ultrasonic signal with the echo signal to output a mixer signal; and one or more processors configured to estimate a distance from the apparatus to the object based on the mixer signal, align the mixer signal in a time domain based on the distance, and detect a frequency response characteristic of the object based on the aligned mixer signal.

2. The apparatus of claim 1, further comprising an analog-to-digital converter (ADC) configured to convert the mixer signal into a digital signal and transmit the digital signal to the one or more processors.

3. The apparatus of claim 2, wherein the one or more processors are further configured to estimate the distance by performing frequency analysis on the digital signal through Fast Fourier Transform (FFT).

4. The apparatus of claim 1, wherein the one or more processors are further configured to determine an analysis range of the aligned mixer signal based on at least one of the estimated distance, a frequency sweep duration, and a frequency sweep rate of the frequency-modulated ultrasonic signal.

5. The apparatus of claim 1, wherein the one or more processors are further configured to detect an envelope based on a signal strength of the aligned mixer signal, and obtain the frequency response characteristic based on the envelope of the aligned mixer signal.

6. The apparatus of claim 1, wherein the one or more processors are further configured to obtain the frequency response characteristic by correcting a frequency characteristic of the transmitter.

7. The apparatus of claim 6, wherein the one or more processors are further configured to correct the frequency characteristic of the transmitter by dividing the obtained frequency response characteristic or the mixer signal by the frequency characteristic of the transmitter.

8. The apparatus of claim 1, wherein the one or more processors are further configured to obtain information about the object by comparing the frequency response characteristic of the object with a frequency response characteristic template pre-stored in a storage device or by inputting the frequency response characteristic of the object to a pre-trained neural network.

9. A method of detecting an object, the method comprising:

emitting a frequency-modulated ultrasound signal toward the object;

receiving an echo signal from the object in response to the frequency-modulated ultrasonic signal being reflected from the object;

mixing the frequency-modulated ultrasound signal with the echo signal to output a mixer signal;

estimating a distance to the object based on the mixer signal;

aligning the mixer signal in a time domain based on the distance; and detecting a frequency response characteristic of the object based on the aligned mixer signal.

10. The method of claim 9, further comprising converting the mixer signal into a digital signal.

11. The method of claim 10, wherein the estimating of the distance from the object comprises estimating the distance to the object by performing frequency analysis on the digital signal through Fast Fourier Transform (FFT).

12. The method of claim 9, wherein the obtaining of the frequency response characteristic of the object further comprises determining an analysis range of the aligned mixer signal based on at least one of the estimated distance, a frequency sweep duration, and a frequency sweep rate of the frequency-modulated ultrasonic signal.

13. The method of claim 9, wherein the obtaining of the frequency response characteristic of the object further comprises detecting an envelope based on a signal strength of the aligned mixer signal.

14. The method of claim 9, wherein the obtaining of the frequency response characteristic of the object comprises obtaining the frequency response characteristic by correcting a frequency characteristic of a transmitter configured to emit the frequency-modulated ultrasound signal.

15. An electronic device comprising:

an ultrasound sensor configured to:

emit a frequency-modulated ultrasonic signal toward an object;

receive an echo signal from the object in response to the frequency-modulated ultrasonic signal being reflected from the object;

mix the frequency-modulated ultrasonic signal with the echo signal to output a mixer signal;

estimate a distance to the object based on the mixer signal;

align the mixer signal in a time domain based on the distance; and detect a frequency response characteristic of the object based on the aligned mixer signal;

obtain information about the object based on the frequency response characteristic:

a memory storing one or more instructions;

a display; and a processor configured to execute the one or more instructions to operate the ultrasound sensor and to control the display to display the information about the object.

* * * * *